United States Patent
Lutz et al.

(10) Patent No.: US 6,188,562 B1
(45) Date of Patent: Feb. 13, 2001

(54) PROCESS AND APPARATUS FOR DROP-OFF RECOGNITION IN A MAGNETICALLY OPERATED DEVICE

(75) Inventors: Danne Lutz, Ronnenberg; Holger Thies, Wunstorf, both of (DE)

(73) Assignee: WABCO GmbH, Hannover (DE)

( * ) Notice: Under 35 U.S.C. 154(b), the term of this patent shall be extended for 0 days.

(21) Appl. No.: 09/156,810

(22) Filed: Sep. 18, 1998

(30) Foreign Application Priority Data

Sep. 24, 1997 (DE) .............................................. 197 42 037

(51) Int. Cl.⁷ .................................................. H01H 47/04
(52) U.S. Cl. .......................... 361/154; 361/160; 361/170
(58) Field of Search ................... 361/152–156, 361/160, 170

(56) References Cited

U.S. PATENT DOCUMENTS

| | | | |
|---|---|---|---|
| 4,608,620 | * | 8/1986 | Hines ..................................... 361/154 |
| 4,631,629 | * | 12/1986 | Mallick, Jr. ........................... 361/154 |
| 4,797,779 | * | 1/1989 | Richards et al. ...................... 361/154 |
| 4,970,622 | * | 11/1990 | Buechl ................................. 361/154 |
| 5,053,911 | * | 10/1991 | Kopec et al. ......................... 361/154 |
| 5,196,983 | * | 3/1993 | Stumpf ................................ 361/154 |
| 5,428,496 | * | 6/1995 | Buchta ................................ 361/154 |
| 5,539,608 | * | 7/1996 | Hurley et al. ........................ 361/154 |
| 5,668,693 | * | 9/1997 | Tennies et al. ....................... 361/154 |
| 5,784,245 | * | 7/1998 | Moraghan et al. ................... 361/154 |

FOREIGN PATENT DOCUMENTS

| | | |
|---|---|---|
| 2728666 | 11/1978 | (DE) . |
| 3611220 | 1/1987 | (DE) . |
| 3817770 | 11/1989 | (DE) . |
| 3922900 | 1/1991 | (DE) . |
| 3928651 | 3/1991 | (DE) . |
| 4013393 | 10/1991 | (DE) . |
| 4403156 | 4/1994 | (DE) . |
| 4237706 | 11/1994 | (DE) . |
| 4433209 | 3/1996 | (DE) . |

* cited by examiner

Primary Examiner—Fritz Fleming
(74) Attorney, Agent, or Firm—ProskauerRose LLP

(57) ABSTRACT

A method and apparatus for the recognition of an armature drop off in an electromagnetically actuated device supplies an on/off controlled switching current to the solenoid coil of the device. A high level of current is caused to flow through the coil for attracting the armature, and reduced level of current is applied to the coil for holding the solenoid armature in its on position. If the armature should be caused to drop off from its on position by a mechanical shock, a transitory expansion in the period of the switching current occurs, due to the sudden decrease in magnetic circuit inductance. This increased switching current period is detected and compared to a predetermined threshold value. If the detected period exceeds the threshold value, it is recognized as an armature drop off, and corrective action can be taken immediately. An alternate embodiment detects a sudden increase in the holding current amplitude as an indicator of armature drop off.

19 Claims, 4 Drawing Sheets

PROCESS AND APPARATUS FOR DROP-OFF RECOGNITION IN A MAGNETICALLY OPERATED DEVICE

RELATED CASE

U.S. patent application Ser. No. 09/156,465, now U.S. Pat. No. 6,017,017, entitled "Process and Apparatus for the Recognition of the State of a Solenoid Valve," is being filed concurrently herewith and is assigned to the assignee of the present application. The above application contains subject matter related to the subject matter of the present application and is incorporated herein by reference.

FIELD OF THE INVENTION

The present invention relates to a process and apparatus for the recognition of the state of a magnetically operated device.

More specifically, the present invention relates to a sensing technique for armature drop off in a device such as a solenoid valve.

BACKGROUND OF THE INVENTION

It is well known in the solenoid valve art that solenoid coil power is supplied by either a longitudinal regulator or a switching regulator. In either case, the function of the regulator is to adjust and control the supply voltage at an appropriate level for the magnetizing solenoid coil.

Since a switching regulator is generally more efficient than a longitudinal regulator, it is usually preferred in solenoid valve applications. A switching regulator alternately switches the supply voltage on and off to the solenoid coil. When the supply is switched on, the resultant current flow in the solenoid coil rises exponentially. When the current level reaches an upper limit value, the regulator shuts the supply off. As a result, the current then drops exponentially. When the current reaches a lower limit value, the supply voltage is again switched on by the action of the regulator. Thus, a mean supply voltage is established, which is regulated at a suitable value for a particular magnetizing solenoid coil. This type of process is disclosed in the German patent application DE 38 17 770.

To be able to switch on a solenoid valve rapidly and reliably, a relatively strong current is initially required for the magnetizing coil. The resulting magnetic force causes the armature of the solenoid to be moved against the force of a return spring. When the armature has reached its switch on position, the magnetizing current is lowered to a holding value, which is sufficient to hold the armature in place. This holding current is preferably adjusted to the lowest possible value, in order to save energy during continuous operation. There is, of course, a nominal holding current limit for reliably preventing the armature from dropping off. This nominal current limit must be set conservatively, i.e., at a higher than minimal level, if the solenoid valve is located in an area exposed to mechanical shock and vibration. This is generally the case, for example, if the solenoid valve is installed in a motor vehicle, especially in the proximity of the engine. This type of environment may cause a holding armature to drop off accidentally, causing the solenoid valve to shut off (or on) a pressure medium. Such an erroneous actuation should be avoided in any situation, but especially when the solenoid valve is used in an application that is relevant for safety, e.g., in the anti-lock braking system of a vehicle.

In the prior art, as disclosed in German patent applications DE 27 28 666 and DE 38 17 770, there are known techniques for recognizing the type of solenoid failure caused by a jammed armature. In these configurations, the switch on current waveform is monitored to detect a sudden deflection, which typically occurs at the time of armature movement.

However, the present invention has a different objective; namely, to detect armature drop off from a holding position as a result of a mechanical disturbance, and to take immediate corrective actions, including automatic restart and transmittal of an error message.

It is a further object of the present invention to detect armature drop off without the addition of special sensors.

It is yet a further object of the present invention to enable a significant reduction in the holding current safety margin, to such an extent that the power loss of a solenoid valve in continuous operation can be reduced by half. As a result, the structural volume of the solenoid valve can also be reduced.

SUMMARY OF THE INVENTION

In accordance with an illustrative embodiment of the present invention, a method for the recognition of an armature drop off within a solenoid valve is as follows:

a) supplying a large magnitude regulated switching current to the solenoid valve coil to achieve switch on of the solenoid valve armature, b) reducing the switching current magnitude to a lower level which is sufficient to hold the armature in the switch on position, c) monitoring the period of the lower level switching current with a time period measuring device, d) comparing the measured lower level switching current period with a predetermined threshold value, which represents a transitory expanded lower level switching current period attributable to a drop off of the armature, e) generating an error signal when the measured lower level switching current period exceeds the predetermined threshold value, and f) restarting the initial turn on cycle in order to return the armature to its switch on position.

An alternative embodiment of the present invention monitors the amplitude of the coil current, in order to detect a sudden increase in the lower level switching current, which is also indicative of an armature drop off.

The aforementioned illustrative embodiments of the present invention are more fully described below in conjunction with the following drawings.

DETAILED DESCRIPTION OF THE INVENTION

Figure 1:
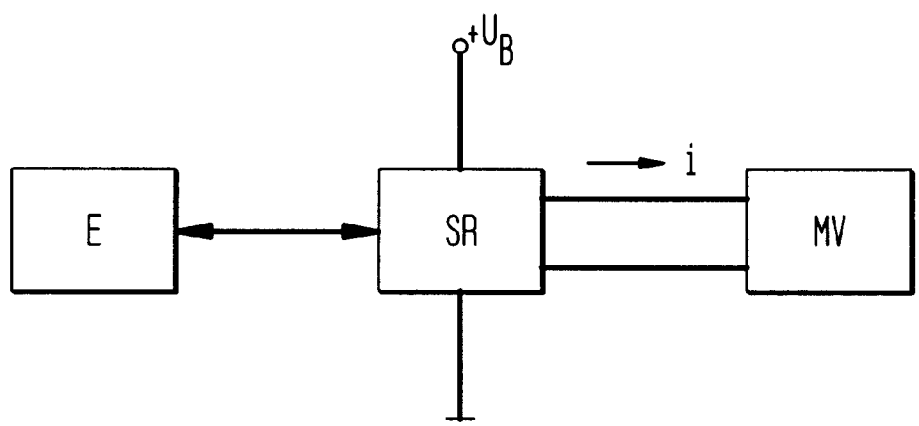
FIG. 1 shows a block diagram of a solenoid valve actuated by a switching regulator.

As shown in FIG. 1, a solenoid valve MV is powered by a switching regulator SR in an on/off operation. Switching regulator SR receives its power from supply voltage $U_B$, and provides an alternating (switching) coil current i through the coil winding of solenoid valve MV. An electronic system E serves to control switching regulator SR. Electronic system E can also receive signals, such as the regulating frequency, from switching regulator SR.

Figure 2:
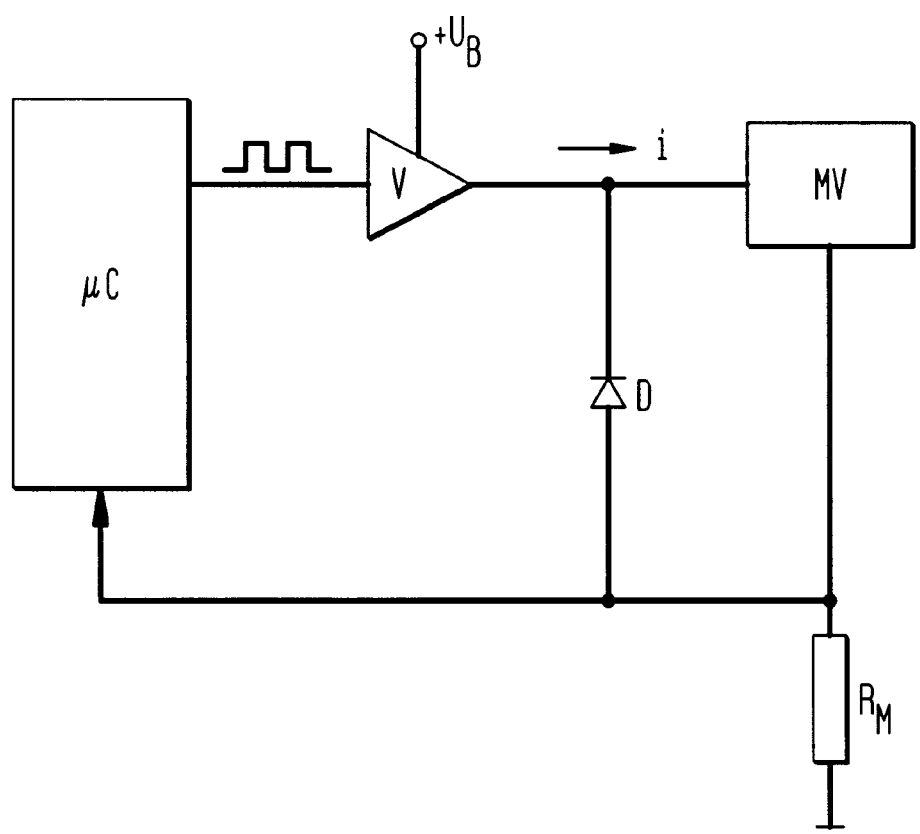
FIG. 2 shows a block diagram of the solenoid valve actuated by a micro-controller and amplifier.

FIG. 2 shows a variant of the actuating circuitry for solenoid valve MV. In this configuration, the coil of solenoid valve MV is driven by alternating pulses, which are generated by a micro-controller μC, via an amplifier V. The circuit is powered by a supply voltage $U_B$. The resultant current i through the solenoid coil is sensed by means of a measuring resistance $R_M$, which is connected in series with the coil of solenoid valve MV. Resistance $R_M$ is approximately 0.1 ohm, and provides feedback of a coil current waveform signal to micro-controller μC. A recovery diode D is also provided to facilitate the switching off of the coil current i, and is connected in parallel with the coil of solenoid valve MV.

Figure 3:
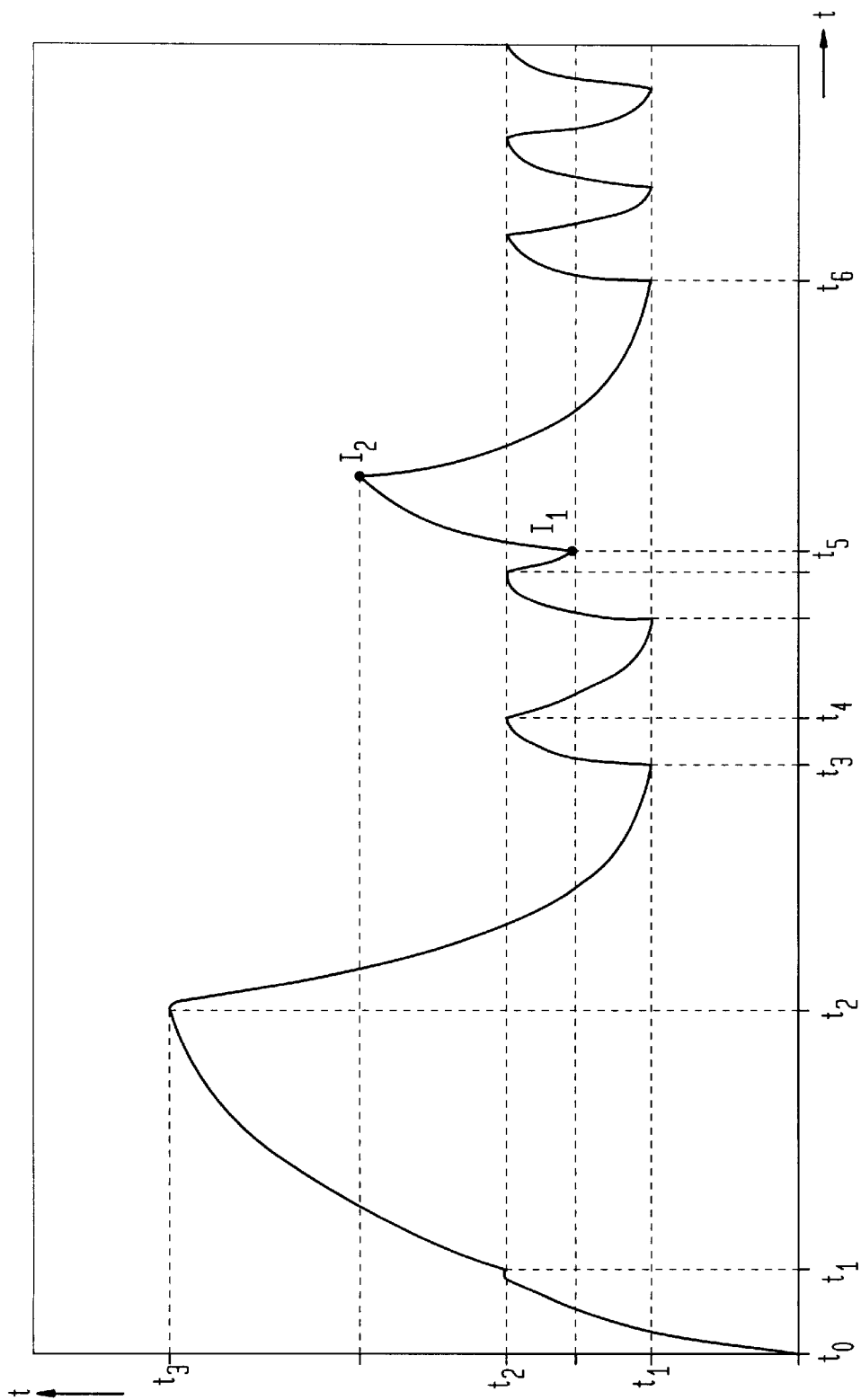
FIG. 3 shows an amplitude-versus-time graph of the solenoid valve coil current.

FIG. 3 shows a graph of coil current i versus time t. At time $t_0$, solenoid valve MV is switched on, by switching regulator SR or by micro-controller μC, connecting the full supply voltage $U_B$ across the coil of solenoid valve MV. Current i rises exponentially until it reaches the upper limit value $i_3$ at time is $t_2$. The limit value $i_3$ is sensed by switching regulator SR, or by micro-controller μC, causing supply voltage $U_B$ to be switched off.

Prior to reaching upper limit value $i_3$, the switch-on current waveform shows a small deflection at $t_1$, which typically occurs at the time of armature movement.

Since the initial voltage $U_B$ impressed across the solenoid coil is considerably higher than its nominal (holding) voltage, solenoid valve MV is switched on very rapidly. Upper limit current $i_3$, however, is not suitable for continuous operation of solenoid valve MV. Therefore, when limit value $i_3$ is reached at time $t_2$ switching regulator SR, or micro-controller μC, switches supply voltage $U_B$ off. Current i then drops exponentially via the recovery diode in the driver circuitry (within switching regulator SR in FIG. 1, or through diode D in FIG. 2). When current i reaches a lower limit value $i_1$ at time $t_3$, an on/off regulation cycle begins. That is, supply voltage $U_B$ is switched on again until current i reaches holding limit value $i_2$ at time $t_4$. At this time, supply voltage $U_B$ is again switched off.

Consequently, coil current i varies within the limits $i_1$ and $i_2$, in a holding operational state. The resultant mean current level is such that the armature of solenoid valve MV is held securely in the switched on state. This mean (holding) current level, however, would not be sufficient for switching on solenoid valve MV initially.

At time $t_5$, it is assumed that a mechanical shock impacts solenoid valve (MV) with sufficient magnitude to overcome the holding current force. This causes the solenoid armature to drop off from its switch on position. Depending on the construction of solenoid valve MV, the number of windings in the magnetizing coil, and the current level $I_1$ flowing at time $t_5$, a characteristic perturbation of the current flow occurs, as shown in FIG. 3, between $t_5$ and $t_6$.

This current flow perturbation is due to the fact that when the armature drops off, the air gap in the magnetic circuit of solenoid valve MV is increased, which causes the magnetic circuit inductance to decrease, in accordance with the following equation:

$$L=N^2/(R_{Fe}+R_{air})\qquad\text{Equation (1)}$$

where
L=inductance of the magnetic circuit
N=number of windings in the coil
$R_{Fe}$=magnetic resistance of the solenoid core
$R_{air}$=magnetic resistance of the solenoid air gap The electromagnetic energy W ($=\frac{1}{2}Li^2$), which was previously stored in the magnetic circuit, is discharged at $t_5$, and causes a brief rise of coil current i, from value $I_1$ to value $I_2$. Current i then drops again to value $i_1$ at time $t_6$.

From $t_6$ on, the normal on/off switching cycle continues, except that the switching frequency of holding current i increases, as shown by the shorter time intervals after $t_6$, in FIG. 3. This increase in switching frequency is due to the decreased inductance of the magnetic circuit, as a result of the increased air gap.

The inventive method and apparatus is designed to evaluate the distinctive expansion of the current i waveform from time $t_5$ to time $t_6$, which occurs as a result of the armature drop off. This type of evaluation can be readily implemented by suitable electronic systems or conventional microcontrollers.

Importantly, the expansion of the period duration of coil current i from $t_5$ to $t_6$ can be evaluated for error recognition, i.e., armature drop off. This expanded period duration is approximately double that of a normal period duration. Therefore, either electronic system E (FIG. 1) or micro-controller μC (FIG. 2) can transmit an error message when a current i period duration exceeds a fixed limit value, as in the case of the time period $t_5$ to $t_6$, in FIG. 3.

It is especially advantageous if a new switch on impulse cycle ($t_0$–$t_3$) can be restarted automatically upon recognition of an armature drop off. When this is done, the failure is corrected immediately.

In accordance with the inventive method, electronic system E, connected to the switch regulator SR in FIG. 1, or micro-controller μC in FIG. 2, can be provided with a device which senses the period duration of coil current i. This period duration can be determined by measuring the time intervals between the minimal value levels ($i_1$) of coil current i, as shown in FIG. 3.

In an alternative embodiment, the increase of coil current i to a maximum value $I_2$ (after $t_5$ in FIG. 3), which occurs during the drop off of the armature during a holding period, can also be evaluated for error recognition. Preferably, this is implemented by electronic system E or micro-controller μC transmitting an error message when coil current i exceeds a predetermined limit value. As in the previous embodiment, a new switch-on impulse cycle ($t_0$–$t_3$) can be restarted automatically upon recognition of an armature drop off.

In order to evaluate the level of current i, electronic system E or micro-controller μC can be equipped with a device for measuring the magnitude of coil current i. This can be done conveniently by measuring the voltage drop across measuring resistance $R_M$, in FIG. 2.

As the micro-controller μC, the readily available model C167 of the Siemens Corporation may be used to advantage. As the switch regulator SR with associated electronic system E, model TCA965B of the Siemens Corporation can be used in the present invention. These devices incorporate all of the components and integrated circuits required for carrying out the functions described above, e.g., generating the error signal, measuring the time periods and amplitudes, various integrations, etc.

Figure 4:
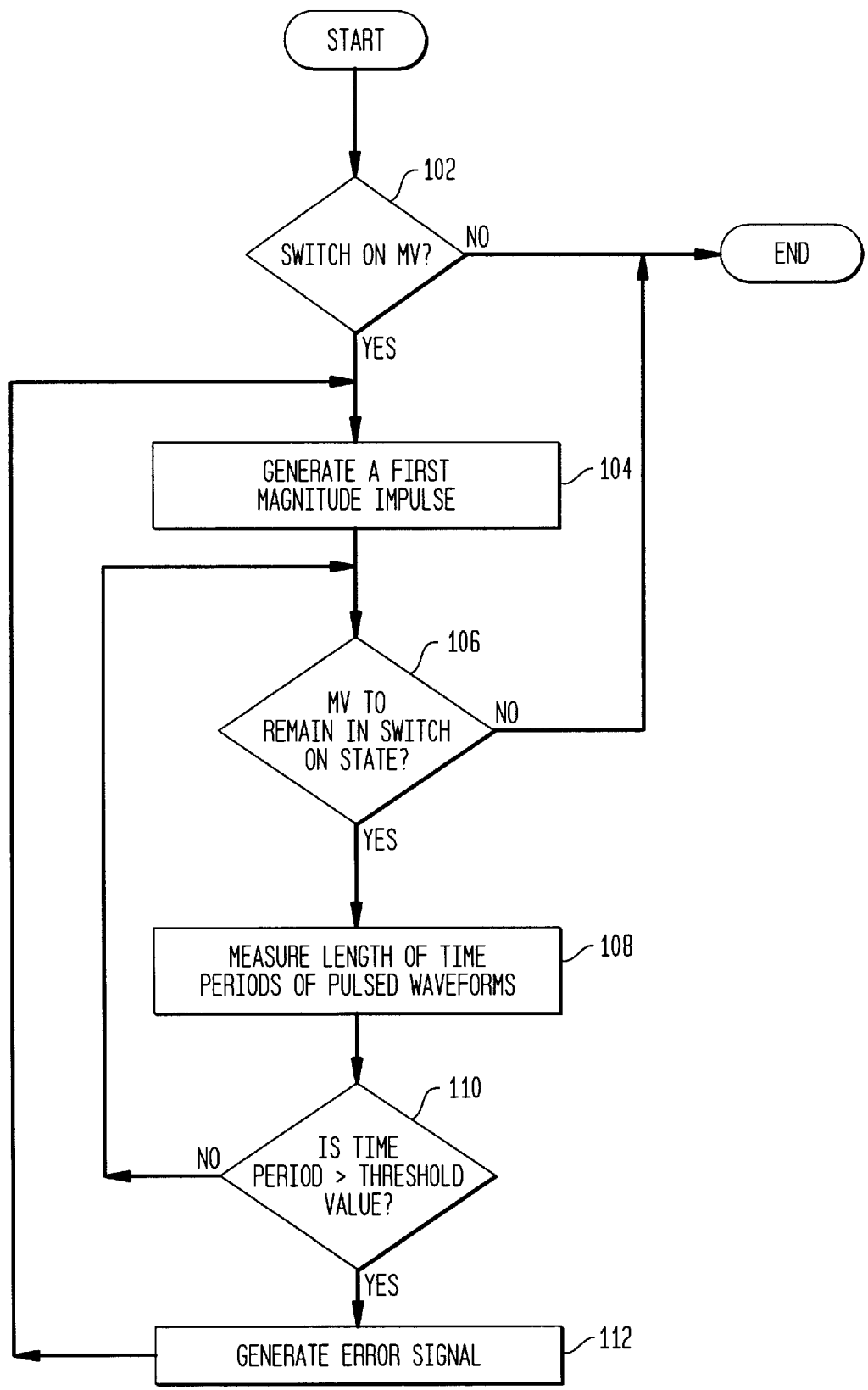
FIGS. 4 and 5 are flow charts illustrating two embodiments of the method of the present invention.

FIG. 4 is a flow chart illustrating the operations of a first embodiment of the invention. These operations are carried out by the electronic system E of FIG. 1 or the micro-controller μC in FIG. 2. For purposes of brevity, the following description will refer to the electronic system E and the micro-controller μC as the "controller."

In decision block 102, the controller determines whether the solenoid valve MV is to be switched on or not. Upon receipt of an appropriate signal, the controller switches on the solenoid valve MV as previously described so that a resultant current of a first magnitude flows through the coil of the solenoid valve MV. This is illustrated in block 104. In decision block 106, the controller determines whether the solenoid valve is to remain in the switch on position or holding state. If the solenoid valve is to remain in the holding state, the controller measures the length of the time periods of the cycles illustrated in FIG. 3, as illustrated in block 108. In decision block 110, the controller determines whether the length of a time period of such cycles exceeds a predetermined threshold. If such threshold is not exceeded, steps 106, 108, and 110 are repeated. However, if a time period exceeds such predetermined threshold, an error signal is generated as illustrated in block 112. In the preferred embodiment of the invention, the controller automatically goes back to step 104 in order to bring the solenoid valve back to the switch on position.

Figure 5:
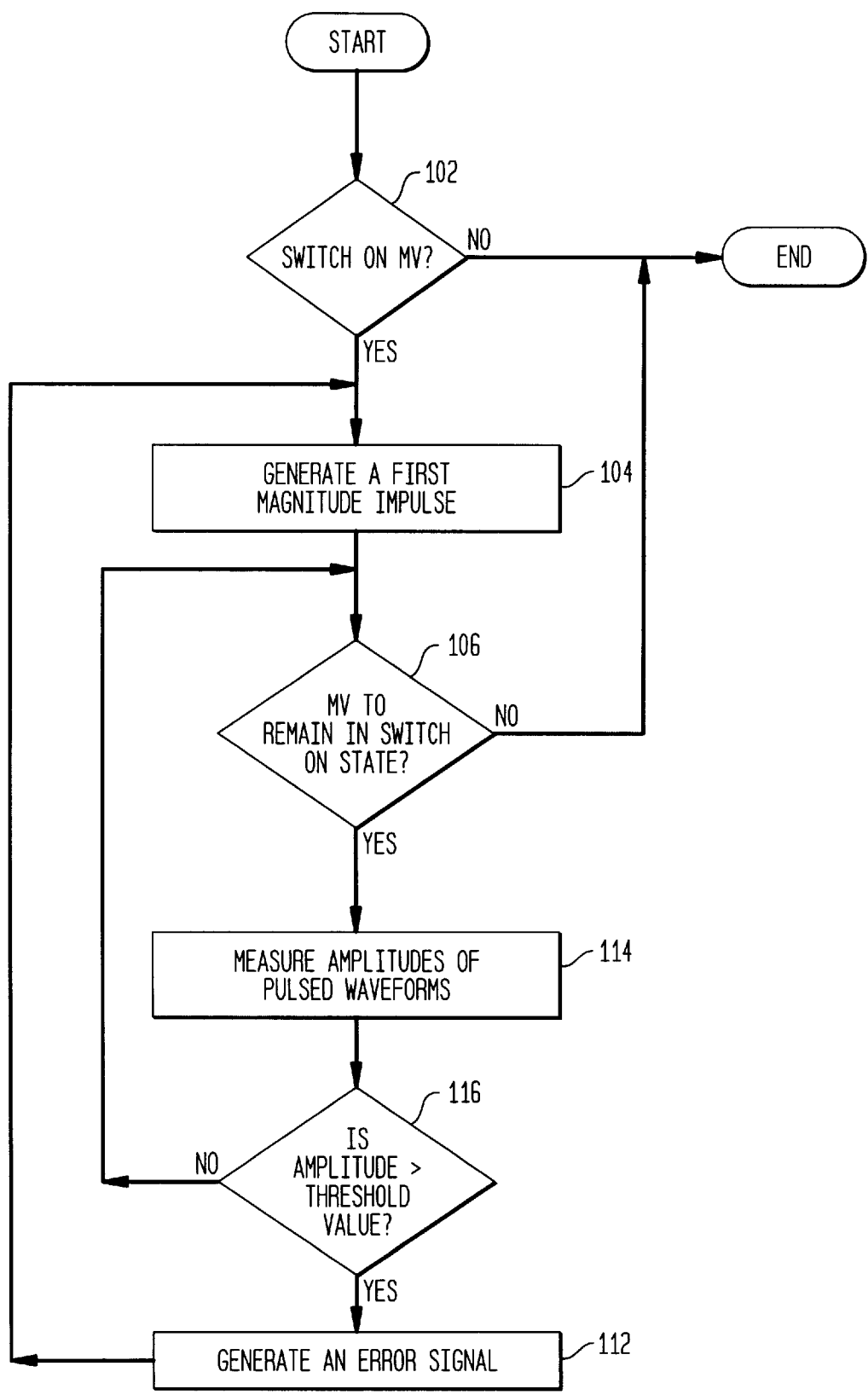

FIG. 5 is a flow chart illustrating a second embodiment of the invention. Like blocks in FIG. 5 have been given the same numbers as in FIG. 4. However, in FIG. 5, instead of measuring the time periods of the cycles, in block 114 the controller measures the amplitude of the current flowing through the coil during the holding state of the solenoid valve. In block 116, if the amplitude exceeds a predetermined threshold, the controller determines that there has been armature drop off and an error signal is generated in block 112. As in the case of FIG. 4, the controller automatically recycles back to step 104.

In short, a method and apparatus is disclosed which enables the rapid detection and recovery of an armature drop off in a solenoid valve. Moreover, the disclosed invention can also be implemented with any type of electromagnetically actuated armature device.

The above described embodiments of the invention are intended to be illustrative only. Numerous alternative embodiments may be devised by those skilled in the art without departing from the spirit and scope of the following claims.

What is claimed is:

1. A method for recognizing armature drop-off in an electromagnetically actuated device which occurs during a holding state of said device, comprising the steps of:
   (a) supplying a supply voltage via an on-off switching regulator to a coil of said device until a first magnitude switch on current impulse flows through said coil thereby causing said armature to assume a switch on position and said device to achieve a switch on state,
   (b) continuously monitoring the current flowing through said coil,
   (c) when said current reaches said first magnitude switch on current, switching off said supply voltage until the current flowing through said coil reaches a second magnitude which is less than said first magnitude,
   (d) when said current reaches said second magnitude, supplying said coil with said supply voltage until the current flowing through said coil reaches a third magnitude, said third magnitude being less than said first magnitude and greater than said second magnitude, said second and third magnitudes of said current in said coil being sufficient to retain said armature in said switch on position,
   (e) when said current reaches said third magnitude, switching off said supply voltage until the current flowing through said coil reaches said second magnitude,
   (f) continuously repeating steps (d) and (e) as cycles thereby achieving a holding state of said device,
   (g) monitoring the time periods of said cycles,
   (h) comparing the time periods of said cycles with a threshold value, said threshold value representing an increase in the time period required due to an armature drop off, and
   (i) generating an error signal when one of the time periods of said cycles exceeds said threshold value.

2. The method of claim 1 further comprising the step of:
   (j) when said error signal is generated, automatically supplying said coil with said supply voltage until said first magnitude switch on current impulse once again flows through said coil, thereby causing said armature once again to move to said switch on position and said device once again to achieve said switch on state.

3. The method of claim 1 wherein said electromagnetically actuated device comprises a valve.

4. An apparatus for recognizing armature drop-off within an electromagnetically actuated valve having an armature and a coil, said apparatus comprising:
   (a) a voltage supply for supplying a supply voltage to said coil,
   (b) a control circuit,
   (c) an on-off switching regulator disposed between said supply voltage and said solenoid valve, said switching regulator being connected to and operating under the control of said control circuit,
   (d) wherein said on-off switching regulator supplies said supply voltage to said coil until a first magnitude switch on current impulse flows through said coil thereby causing said armature to assume a switch on position and said valve to achieve a switch on state,
   (e) wherein said control circuit continuously monitors the current flowing through said coil,
   (f) wherein when said current reaches said first magnitude switch on current, said control circuit causes said on-off switching regulator to switch off said supply voltage until the current flowing through said coil reaches a second magnitude which is less than said first magnitude,
   (g) wherein when said current reaches said second magnitude, said control circuit causes said on-off switching regulator to supply said coil with said supply voltage until the current flowing through said coil reaches a third magnitude, said third magnitude being less than said first magnitude and greater than said second magnitude, said second and third magnitudes of said current in said coil being sufficient to retain said armature in said switch on position,
   (h) wherein when said current reaches said third magnitude, said control circuit causes said on-off switching regulator to switch off said supply voltage until the current flowing through said coil reaches said second magnitude,
   (i) wherein said control circuit continuously repeats steps (g) and (h) as cycles thereby achieving a holding state of said device,
   (j) said apparatus further including a time period measuring device connected to said coil which compares the time periods of said cycles with a threshold value, said threshold value representing an increase in the time period due to an armature drop off, and
   (k) wherein said control circuit generates an error signal when one of the time periods of said cycles exceeds said threshold value.

5. The apparatus of claim 4 wherein said time period measuring device is integrated into said on-off switching regulator.

6. The apparatus of claim 4 wherein said time period measuring device is integrated into said control circuit.

7. The apparatus of claim 4 wherein said time period measuring device comprises a counting device.

8. The apparatus of claim 4 wherein said control circuit and said on-off switching regulator are replaced by a micro-controller circuit and an amplifier circuit.

9. The apparatus of claim 8 wherein said time period measuring device is integrated into said micro-controller circuit.

10. A method for recognizing armature drop-off in an electromagnetically actuated device which occurs during a holding state of said device, comprising the steps of:

(a) supplying a supply voltage via an on-off switching regulator to a coil of said device until a first magnitude switch on current impulse flows through said coil thereby causing said armature to assume a switch on position and said device to achieve a switch on state, (b) continuously monitoring the current flowing through said coil;

(c) when said current reaches said first magnitude switch on current, switching off said supply voltage until the current flowing through said coil reaches a second magnitude which is less than said first magnitude, (d) when said current reaches said second magnitude, supplying said coil with said supply voltage until the current flowing through said coil reaches a third magnitude, said third magnitude being less than said first magnitude and greater than said second magnitude, said second and third magnitudes of said current in said coil being sufficient to retain said armature in said switch on position, (e) when said current reaches said third magnitude, switching off said supply voltage until the current flowing through said coil reaches said second magnitude, (f) continuously repeating steps (d) and (e) as cycles thereby achieving a holding state of said device, (g) monitoring the amplitude of the current flowing through said coil during said cycles, (h) comparing the amplitudes of said cycles with a threshold value, said threshold value being greater than said third magnitude and representing an increase in the current flowing through said coil due to an armature drop off, and (i) generating an error signal when one of the amplitudes of said cycles exceeds said threshold value.

11. The method of claim 10 further comprising the step of:

(j) when said error signal is generated automatically supplying said coil with said supply voltage until said first magnitude switch on current impulse once again flows through said coil, thereby causing said armature once again to move to said switch on position and said device once again to achieve said switch on state.

12. The method of claim 11 wherein said electromagnetically actuated device comprises a valve.

13. An apparatus for recognizing armature drop-off within an electromagnetically actuated valve having an armature and a coil, said apparatus comprising:

(a) a voltage supply for supplying a supply voltage to said coil, (b) a control circuit, (c) an on-off switching regulator disposed between said supply voltage and said solenoid valve, said switching regulator being connected to and operating under the control of said control circuit, (d) wherein said on-off switching regulator supplies said supply voltage to said coil until a first magnitude switch on current impulse flows through said coil thereby causing said armature to assume a switch on position and said valve to achieve a switch on state, (e) wherein said control circuit continuously monitors the current flowing through said coil, (f) wherein when said current reaches said first magnitude switch on current, said control circuit causes said on-off switching regulator to switch off said supply voltage until the current flowing through said coil reaches a second magnitude which is less than said first magnitude, (g) wherein when said current reaches said second magnitude, said control circuit causes said on-off switching regulator to supply said coil with said supply voltage until the current flowing through said coil reaches a third magnitude, said third magnitude being less than said first magnitude and greater than said second magnitude, said second and third magnitudes of said current in said coil being sufficient to retain said armature in said switch on position, (h) wherein when said current reaches said third magnitude, said control circuit causes said on-off switching regulator to switch off said supply voltage until the current flowing through said coil reaches said second magnitude, (i) wherein said control circuit continuously repeats steps (g) and (h) as cycles thereby achieving a holding state of said device, (j) said apparatus further including a current measuring device connected to said coil which compares the current amplitudes of said cycles with a threshold value, said threshold value being greater than said third magnitude and representing an increase in the current flowing through said coil due to an armature drop off, and (k) wherein said control circuit generates an error signal when one of the amplitudes of said cycles exceeds said threshold value.

14. The apparatus of claim 13 wherein said current measuring device is integrated into said on-off switching regulator.

15. The apparatus of claim 13 wherein said current measuring device is integrated into said control circuit.

16. The apparatus of claim 13 wherein said control circuit and said on-off switching regulator are replaced by a micro-controller circuit and an amplifier circuit.

17. The apparatus of claim 16 wherein said current measuring device is integrated into said micro-controller circuit.

18. The apparatus of claim 16 further comprising a measuring resistance connected in series with said coil.

19. The apparatus of claim 16 wherein said current measuring device measures the current flowing through said coil by measuring the voltage drop across said measuring resistance.

* * * * *